(12) United States Patent
Dame

(10) Patent No.: US 9,571,378 B2
(45) Date of Patent: Feb. 14, 2017

(54) SYNCHRONIZED WIRELESS DATA CONCENTRATOR FOR AIRBORNE WIRELESS SENSOR NETWORKS

(75) Inventor: Stephen G. Dame, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 641 days.

(21) Appl. No.: 13/171,280

(22) Filed: Jun. 28, 2011

(65) Prior Publication Data

US 2013/0003620 A1 Jan. 3, 2013

(51) Int. Cl.
*H04B 7/14* (2006.01)
*H04L 12/701* (2013.01)
*H01Q 1/00* (2006.01)
*H01Q 1/28* (2006.01)
*H04L 12/721* (2013.01)
*H04W 84/18* (2009.01)
*H04J 3/06* (2006.01)

(52) U.S. Cl.
CPC ............. *H04L 45/00* (2013.01); *H01Q 1/007* (2013.01); *H01Q 1/28* (2013.01); *H04L 45/12* (2013.01); *H04W 84/18* (2013.01); *H04J 3/0667* (2013.01)

(58) Field of Classification Search
CPC ........... H01Q 1/007; H01Q 1/28; H04L 45/12; H04L 45/00; H01W 84/18; H01J 3/0667
USPC ....... 370/279, 293, 310, 315, 316, 324, 492, 370/501; 375/211; 379/4, 146, 238, 296, 379/338, 420, 432; 455/7–13.1; 340/971
See application file for complete search history.

(56) References Cited

U.S. PATENT DOCUMENTS

| | | | |
|---|---|---|---|
| 4,200,770 A | 4/1980 | Hellman et al. | |
| 2005/0021946 A1* | 1/2005 | Narayanan | H04L 45/00 713/163 |
| 2006/0133614 A1* | 6/2006 | Zhang | H04L 9/12 380/273 |
| 2006/0159260 A1 | 7/2006 | Pereira et al. | |
| 2008/0228331 A1 | 9/2008 | McNerney et al. | |
| 2008/0228346 A1* | 9/2008 | Lucas et al. | 701/33 |
| 2009/0119243 A1 | 5/2009 | Yuan et al. | |
| 2009/0153356 A1* | 6/2009 | Holt | G01D 4/004 340/870.02 |
| 2009/0243895 A1* | 10/2009 | Mitchell et al. | 340/971 |
| 2010/0098204 A1* | 4/2010 | Ratiu et al. | 375/371 |
| 2010/0183152 A1 | 7/2010 | Hubner et al. | |
| 2012/0209752 A1* | 8/2012 | Rollinson-Smith | 705/30 |

FOREIGN PATENT DOCUMENTS

| | | |
|---|---|---|
| WO | 2010092152 A1 | 8/2010 |
| WO | 2010095923 A2 | 8/2010 |

OTHER PUBLICATIONS

Ergen, ZigBee/IEEE 802.15.4 Summary, Berkeley, Sep. 10, 2004.*

(Continued)

*Primary Examiner* — Mang Yeung
(74) *Attorney, Agent, or Firm* — Vista IP Law Group LLP; Cynthia A. Dixon

(57) ABSTRACT

A system, method, and apparatus for a synchronized wireless data concentrator are provided for facilitating a precisely synchronized system of nodes in a wireless sensor network for airborne data systems. The wireless data concentrator contains a plurality of IEEE 802.15.4 radio/microprocessor subsystems, which are connected to a local host microprocessor, which is in turn connected to an aircraft data network. The airplane data network also contains a precision clock source and a plurality of specialized network switches, which have a low-jitter data-path routing capability.

20 Claims, 8 Drawing Sheets

(56) References Cited

OTHER PUBLICATIONS

Microchip AN1255, Microchip ZigBee Pro Feature Set Protocol Stack, Microchip Technology Inc., 2009 (p. 17).
STM32F107 Microprocessor, STM Microelectronics, May 2010.
Abracon 20.000MHz High Precision Clock Xtal, Abracon Corporation, Sep. 20, 2007.
Epson 32.768KHz Low Power/Low Cost Xtal, Epson Toyocom.
Cho, Hyuntae, et al., Implementation of a Precision Time Protocol over Low Rate Wireless Personal Area Networks, IEEE, 2008.
Schreier, Paul G., IEEE 1588 to Transform Timing Synchronization, Evaluation Engineering.Com (EE), Apr. 2009.
Extended European Search Report, EP Application Serial No. 12162019.9, Jun. 12, 2012.

\* cited by examiner

| NOM FREQ | ppm +/- spec | Min Freq | Max Freq | COUNTS | | TIME | |
|---|---|---|---|---|---|---|---|
| | | | | Drift/Sec | Drift/Min | MAX us/Sec | MAX us/Min |
| 32768 | 5 | 32767.83616 | 32768.16384 | 0.16384 | 9.8304 | 5 | 300 |
| 20000000 | 0.5 | 19999990 | 20000010 | 10 | 600 | 0.5 | 30 |

SYNCHRONIZED WIRELESS DATA CONCENTRATOR FOR AIRBORNE WIRELESS SENSOR NETWORKS

BACKGROUND

The present disclosure relates to synchronized wireless data concentrators. In particular, it relates to synchronized wireless data concentrators for airborne wireless sensor networks.

SUMMARY

The present disclosure relates to an apparatus, system, and method for synchronized wireless data concentrators for airborne wireless sensor networks. In one or more embodiments, the disclosed system for airborne wireless sensor networks includes at least one wireless data concentrator (WDC) operable as a router. The system further includes at least one processor that runs hosted applications related to at least one WDC operable as a router. Also, the system includes at least one network switch that is connected to at least one WDC operable as a router and connected to at least one processor. In addition, the system includes at least one node that is wirelessly in communication with at least one WDC operable as a router.

In one or more embodiments, at least one WDC operable as a router includes at least one standard router, and at least one node that operates as a standard node. In at least one embodiment, at least one standard router and/or at least one node operable as a standard node employ a Zigbee communications protocol. In some embodiments, at least one standard router transmits and receives signals to at least one node operable as a standard node. In one or more embodiments, at least one node operable as a standard node is powered by battery power, a wired power line, and/or strong harvested energy. In some embodiments, the strong harvested energy is harvested from thermoelectric power, vibration, and/or inductive coupling to a high voltage (e.g., a high voltage produced by generators).

In at least one embodiment, at least one WDC operable as a router includes at least one green router, and at least one node that operates as a green node. In one or more embodiments, at least one green router and/or at least one node operable as a green node employ the Zigbee communications protocol. In some embodiments, at least one green router receives signals from at least one node operable as a green node. In one or more embodiments, at least one node operable as a green node transmits its state three times sequentially in a row to at least one green router. In at least one embodiment, at least one node operable as a green node is powered by harvested energy. In some embodiments, the harvested energy is harvested from solar power and/or manual actuation power (e.g., the manual action of flipping a switch).

In one or more embodiments, at least one processor is an application server. In at least one embodiment, at least one network switch is an Ethernet switch (e.g., an IEEE-1588 Ethernet switch). In some embodiments, the disclosed system further includes at least one WDC operable as a coordinator. In at least one embodiment, at least one WDC operable as a coordinator employs the Zigbee communications protocol. In one or more embodiments, at least one WDC operable as a coordinator is in wireless communication with at least one WDC operable as a router. In at least one embodiment, at least one WDC operable as a coordinator coordinates communications with at least one WDC operable as a router.

In at least one embodiment, the disclosed method for airborne wireless sensor networks involves transmitting state information from at least one node. The method further involves receiving, by at least one wireless data concentrator (WDC) operable as a router, the state information from the node(s). In addition, the method involves transmitting the state information from at least one WDC operable as a router. Additionally, the method involves receiving, by at least one WDC operable as a coordinator, the state information from the WDC(s) operable as a router. Further, the method involves sending the state information, by at least one WDC operable as a coordinator, to at least one processor for processing. In one or more embodiments, the method further involves coordinating, by at least one WDC operable as a coordinator, communications with at least one WDC operable as a router. In at least one embodiment, the state information is sent from at least one WDC operable as a coordinator to at least one processor via a network switch.

In one or more embodiments, the disclosed wireless data concentrator (WDC) for airborne wireless sensor networks includes at least one router, where at least one node is in communication with the router(s). In addition, the disclosed WDC includes at least one microprocessor, where the microprocessor(s) processes signals received by the router(s) from the node(s). The disclosed WDC further includes at least one clock crystal, where the clock crystal(s) is used for synchronizing communications for at least one router.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
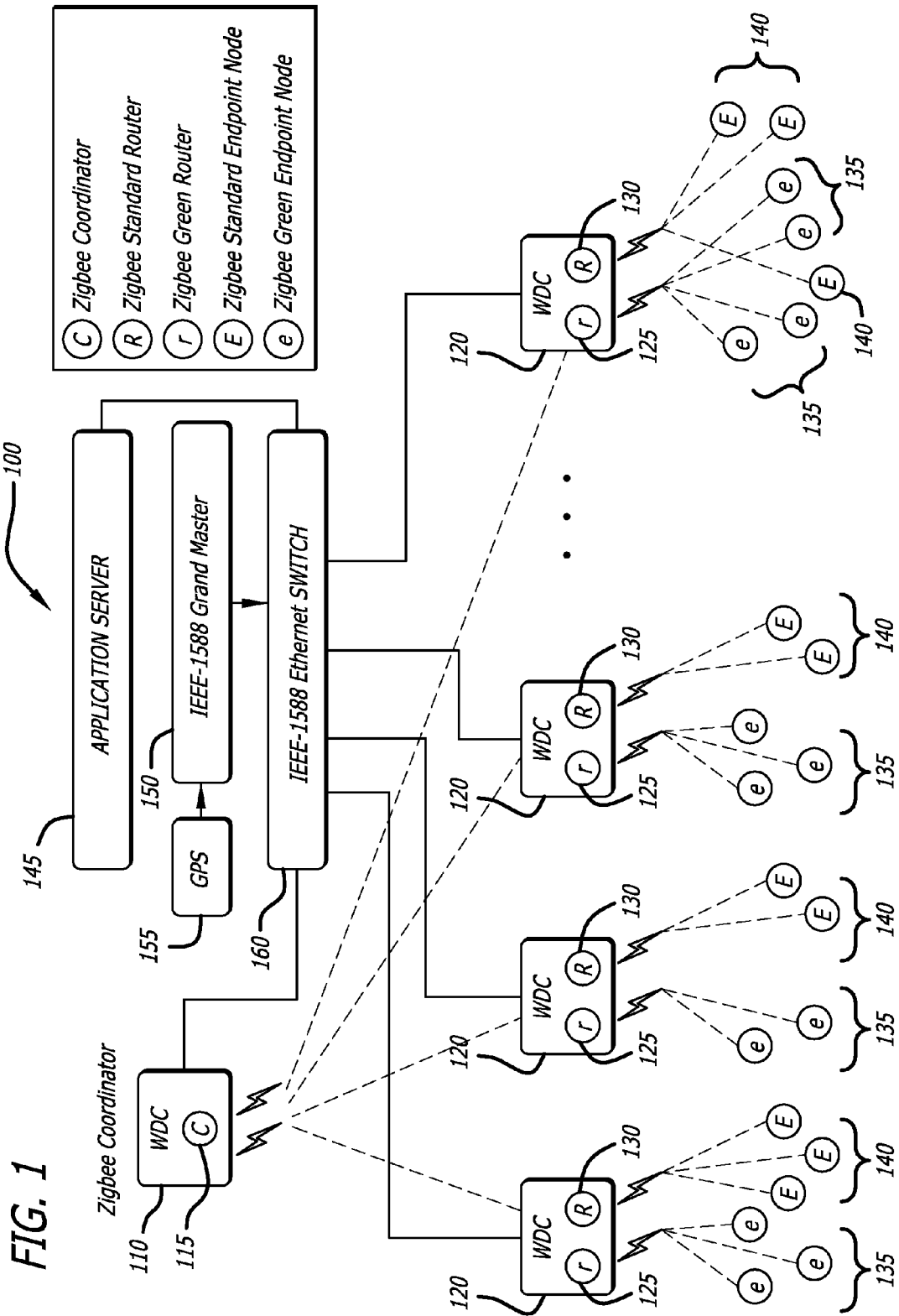
FIG. 1 shows a high level architectural view of the disclosed system for synchronized wireless data concentrators (WDCs) for airborne wireless sensor networks, in accordance with at least one embodiment of the present disclosure.

The methods and apparatus disclosed herein provide an operative system for wireless data concentrators. Specifically, this system relates to synchronized wireless data concentrators (WDCs) for airborne wireless sensor networks. In particular, the present disclosure teaches a wireless data concentrator (WDC) architecture that significantly advances the flexibility, adaptability, utility, determinism, and security in a large network of wireless sensor network (WSN) devices, which are applied to a commercial aerospace environment. The application space for aircraft WSNs is diverse and poses challenges in reliability, bandwidth management, latency, and security domains. The present disclosure sets forth a broad architecture structure, and a WDC design, which can support the objectives of improved flexibility, adaptability, utility, determinism, and security more than the currently offered solutions.

Key aspects that are provided by the disclosed system are: 1.) precision time synchronization of nodes in a wireless sensor network to enable a system design pattern of time-based real-time programming; 2.) bandwidth, throughput, and latency management in a large IEEE-802.15.4 wireless sensor network through the use of a wired Ethernet backbone topology; 3.) a distributed trust center, a wired secure key-transport, and key management system; and 4.) parallel WSN channel operation for optimized wireless bandwidth.

Zigbee is a type of Low Power Wireless Personal Area Network (LP-WPAN) data communication protocol stack, which is used to standardize low data rate transmission between low power wireless devices. Zigbee does not describe the entire software communication stack, but is rather a set of networking framework layers built on top of the IEEE-802.15.4 standard. Systems and environments that typically deploy Zigbee are environments such as home automation, home entertainment, building automation and, most recently, smart energy. Aerospace non-essential systems represent a new area for LP-WPAN deployment so that smart wireless sensors can be distributed throughout the aircraft cabin, structures, and systems; and can provide monitoring, alerting, on-demand services, and non-essential control functions.

However, when considering employing Zigbee for a large scale architecture adaptable to a wide range of aerospace applications, it is important to understand some of the shortcomings imposed by Zigbee. Although Zigbee is a robust stack, certain design decisions have been made by commercial microprocessor/radio hardware chip manufacturers and Zigbee software stack vendors. These decisions have been made in order to accommodate the size of object code that can fit into current program memory and runtime variables in data memory within various low cost Zigbee/802.15.4 radios in today's marketplace. Some of these shortcomings are: lack of medium access control (MAC) and network (NWK) layer support for time-slotted or time-based design patterns, the data security is limited to symmetric-key algorithms, lack of a secure key management system, and lack of robust support for energy harvesting sensor devices.

The system of the present disclosure sets forth an architectural structure and a network topology that significantly improves over the limitations stated above to better address the additional environmental and application requirements of airborne systems. The main features of the disclosed system are: 1.) an introduction of a low cost, local host microprocessor within the wireless data concentrator, which is hardwire connected to both an Ethernet backbone and a plurality of wireless sensor network "router" devices; 2.) an inclusion of a system-wide hierarchical, precision time distribution means to bridge into the wireless sensor network area; 3.) a distributed security trust center mechanism for fast and secure management of network keys; and 4.) parallel Zigbee channel capability that can better handle throughput, latency, and energy harvesting performance demands on the system.

FIG. 1 shows a high level architectural view of the disclosed system 100 for synchronized wireless data concentrators (WDCs) 110, 120 for airborne wireless sensor networks, in accordance with at least one embodiment of the present disclosure. In this figure, the system 100 is shown to include five (5) WDCs. Four (4) of the WDCs 120 are operating as routers, and one WDC 110 is operating as a coordinator. The one WDC 110 operating as a coordinator 115 communicates wirelessly (as denoted by the dashed lines in the figure) with the four WDCs 120, and coordinates the communications of the four WDCs 120, which are all situated in a single aircraft zone. In general, one WDC 110 operating as a coordinator is employed per aircraft zone. An aircraft zone is, for example, a specific defined area within the cabin and/or cockpit of an aircraft. The WDC 110 operating as a coordinator is wired (as denoted by the solid line in the figure) to an IEEE-1588 Ethernet switch 160, and employs the Zigbee communications protocol.

The four WDCs 120 operating as routers are wired (as denoted by the solid lines in the figure) to the IEEE-1588 Ethernet switch 160, which is connected to an application server 145. The application server 145, which includes at least one processor, is used to run host applications. In addition, a GPS receiver 155 is connected to an IEEE-1588 Grand Master 150, which uses a GPS signal from the GPS receiver 155 for time synchronization. The Grand Master 150 is connected to the IEEE-1588 Ethernet switch 160, and passes time synchronization data packets to the IEEE-1588 Ethernet switch 160 through that connection.

Each of the four WDCs 120 operating as routers is shown to include one Zigbee green router 125 and one Zigbee standard router 130. It should be noted that in other embodiments, the system 100 may employ WDCs 120 that include various different quantities of Zigbee green routers 125 and Zigbee standard routers 130. Both the Zigbee green router 125 and the Zigbee standard router 130 employ the Zigbee communications protocol. The Zigbee standard router 130 transmits and receives signals to Zigbee standard endpoint nodes 140, which contain monitoring sensors and are situated about the aircraft cabin within the specific aircraft zone of the WDCs 110, 120. The signals include information regarding the state of the Zigbee standard endpoint nodes 140, time synchronization information, as well as acknowledgement (ACK) information (e.g., acknowledgement information sent in ACK data packets) regarding the receipt of the state information. The Zigbee standard endpoint nodes 140 are powered by various means including, but not limited to, battery power, a wired power line, and strong harvested energy. It should be noted that types of strong harvested energy include, but are not limited to, thermoelectric power, vibration, and inductive couple to a high voltage.

The Zigbee green router 125 receives signals from Zigbee green endpoint nodes 135, which contain monitoring sensors and are situated about the aircraft cabin within the specific aircraft zone of the WDCs 110, 120. It should be noted that the Zigbee green router 125 does not transmit signals, it only receives signals. The Zigbee standard endpoint nodes 135 periodically transmit their respective state three times sequentially in a row. Since the Zigbee green router 125 cannot transmit signals, the Zigbee green router 125 does not send acknowledgement signals regarding the receipt of state information to the Zigbee green endpoint nodes 135. The Zigbee green endpoint nodes 135 are powered by harvested energy, which includes, but is not limited to, solar power and manual actuation power.

The system 100 of FIG. 1 is applicable to numerous applications within the aircraft. Examples of these applications include, but are not limited to, passenger control of reading lights; window dimming and flight attendant call lights from energy harvesting control buttons in the seats; aircraft systems monitoring functions, such as temperature and air flow within the passenger cabin; and sensors within the aircraft structure, engines, landing gear, wings, tail sections, power systems, hydraulic systems, or any other system within the aircraft that can benefit from prognostic monitoring of aircraft health and system state. The sensors of the endpoints 135, 140 are designed to sense various things according to their function for the particular application(s) of the system 100. Types of things that the sensors are designed to sense include, but are not limited to, temperature, light, power, and air flow. In this figure, a software application server 145 contains certain "hosted functions." These "hosted functions" are software programs designed to receive information from various sensing elements. The programs then store and process this information into useful operations for passengers, crew, and/or maintenance personnel, as dictated by the requirements of the "function." The "hosted functions" communicate with various sensors via the Ethernet switch 160, which is connected to a plurality of WDCs 110, 120 strategically positioned throughout an aircraft.

The disclosed system 100 uses the IEEE-1588 precision time protocol (PTP) as a baseline timing means that is extended to the various WDCs 110, 120 through the IEEE-1588 compliant Ethernet switch 160. In order to utilize IEEE-1588, a suitable PTP time generator, such as the Symmetricon "Timeprovider 5000", is utilized to provide a grand master time base to the network. The IEEE-1588 grand master 150 typically gets its reference time from a GPS signal to provide better than a 100 nanosecond time synchronization to global Earth time. Precision time packets are distributed through the Ethernet switch 160 to each of the WDCs 110, 120, where the time synchronization is maintained at each WDC 110, 120 within the typical performance limits of a typical IEEE-1588 Ethernet network (i.e. <microsecond). An important feature of this system 100 design is the bridging of the PTP protocol through the 802.15.4 Zigbee router devices 125, 130 to Zigbee endpoints 135, 140 served by each router 125, 130 within a WDC 120. In at least one embodiment, a single WDC 110 coordinator 115 starts the network in a traditional Zigbee protocol, but then can optionally distribute the coordinator function to selected WDCs 120. This feature helps to improve the performance and management of large number of sensors within the purview of the WDC 110 selected for the distributed coordinator function, when the number of endpoints 135, 140 exceeds a predetermined threshold.

Figure 2:
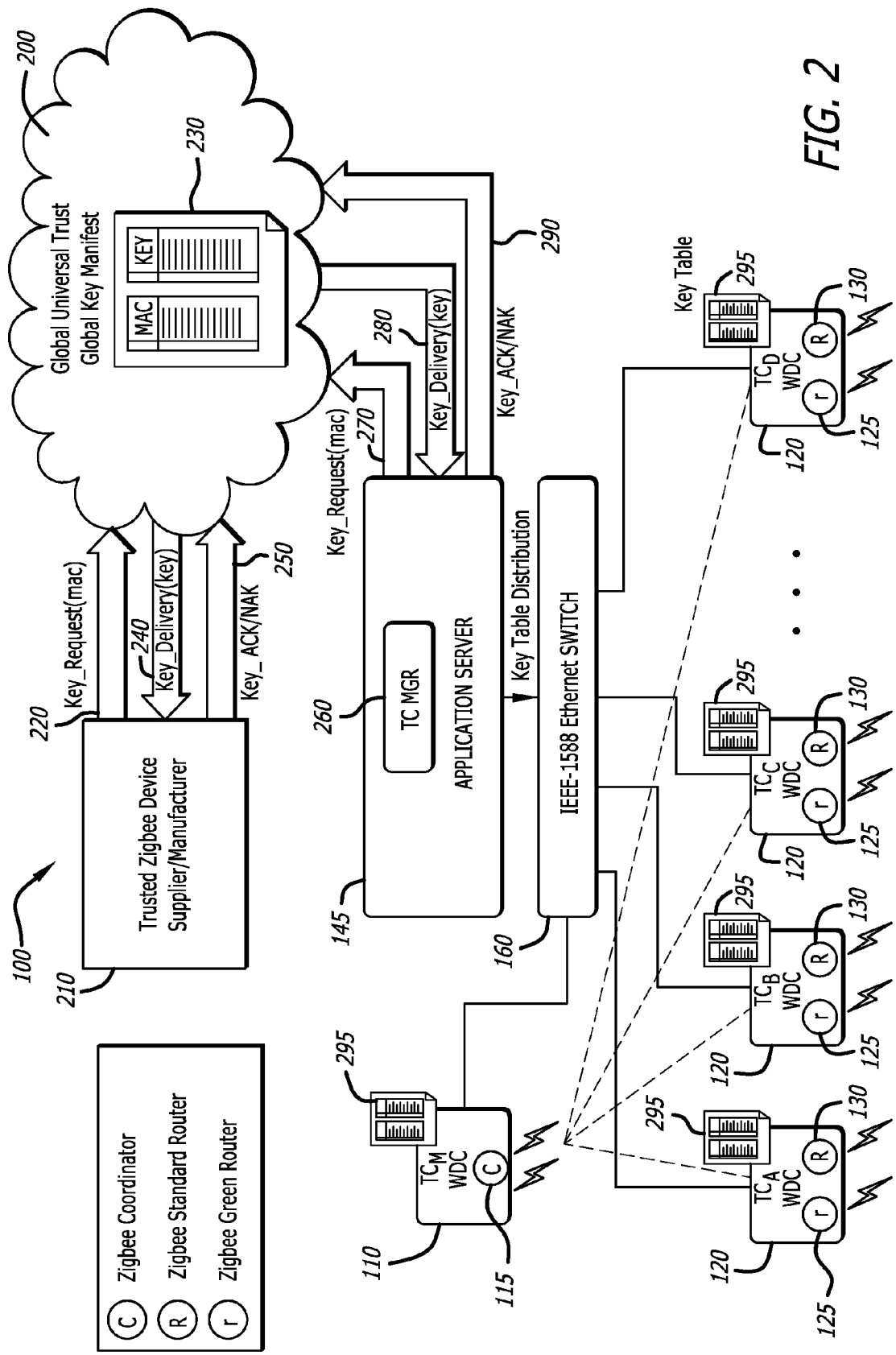
FIG. 2 is a detailed diagram showing the process for how keys are securely managed within the system of FIG. 1, in accordance with at least one embodiment of the present disclosure.

FIG. 2 is a detailed diagram showing the process for how keys are securely managed within the system 100 of FIG. 1, in accordance with at least one embodiment of the present disclosure. A typical Zigbee environment will have a single trust center manager ($TC_M$) designated at the WDC 110 that is operating as a coordinator of the network. The Zigbee address of the trust center manager is usually aligned with the address of the WDC 110 that is operating as a coordinator, but this is generally a programmable register within any WDC 110, 120 on a Zigbee network such that an alternate trust center (e.g., $TC_A$, $TC_B$, $TC_C$, or $TC_D$) at a different WDC 120 may be established. Zigbee Pro only defines support for symmetric encryption keys. Zigbee networks employ three types of keys: a network key, a link key, and a master key. A network key is applicable to every Zigbee WDC device 110, 120 in a given personal area network (PAN) within the aircraft (i.e. a Zigbee local network is identified by one unique PAN identification (ID)). A link key is a key established between two WDC devices 110, 120 of a Zigbee application. The master key is a key which is used to allow a Zigbee WDC device 110, 120 to initially join a network. In a high security mode, as defined in the Zigbee Pro specification, the master key is used to establish link keys, and must be configured on new WDC devices 110, 120 "out-of-band." "Out-of-band" refers to programming or configuring a WDC device 110, 120 in an environment different from the wireless network, such as manually typing a key into a WDC device 110, 120 at the time of manufacturing.

FIG. 2 shows a preferred embodiment of a trusted supplier 210 providing device identifiers ("MAC addresses") to a global universal trust 200, which will then issue a set of trusted master keys corresponding to each of the WDC devices' MAC addresses. The trusted supplier 210 then pre-configures the WDC device 110, 120 with the master key issued by the global universal trust 200. In particular, as shown in this figure, a trusted Zigbee device supplier/manufacturer 210 sends a request 220 to the global universal trust center 200 for a key for a new WDC device 110, 120 that it is manufacturing. The request that the supplier 210 sends to the trust center 200 includes the MAC address for the new WDC device 110, 120. The trust center 200 has a global key manifest 230 that contains a listing of the specific keys that correspond to particular WDC device MAC addresses. The trust center 200 sends to the supplier 210 a key 240, which corresponds to the WDC device's MAC address according to the global key manifest 230. In response, the supplier 210 sends a response 250 to the trust center 200 indicating that the supplier 210 successfully received the key (acknowledgement (ACK)) or did not successfully receive the key (no acknowledgement (NAK)).

Upon initial commissioning of WDC devices 110, 120 on a new aircraft (or for replacement equipment on an existing aircraft), a trusted Internet connection must be made between the application server 145 and the global universal trust 200 (i.e. trust center 200). New WDC devices 110, 120 that attempt to join the aircraft Zigbee network will cause an aircraft trust center (located at a WDC 110, 120) to communicate with the trust center manager function (TC MGR) 260, which will make a request to the global universal trust 200 for a master key for the new WDC device 110, 120 requesting to join the network. Once a WDC device 110, 120 has been authenticated by the trust center manager 260, then a key exchange process will occur, and a new encrypted key will be delivered to the new WDC device 110, 120 joining the Zigbee network. In particular, as shown in FIG. 2, the trust center manager function (TC MGR) 260 sends a request 270 to the global universal trust 200 for a key for the new WDC device 110, 120 that is requesting to join the network. The request 270 that the trust center manager function 260 sends to the trust center 200 includes the MAC address for the new WDC device 110, 120. The global universal trust 200 sends 280 to the trust center manager function 260 a key 240, which corresponds to the WDC device's MAC address according to the global key manifest 230. In response, the trust center manager function 260 sends a response 290 to the global universal trust 200 indicating that the trust center manager function 260 successfully received the key (acknowledgement (ACK)) or did not successfully receive the key (no acknowledgement (NAK)). It should be noted that additional keys and data can be exchanged on the network with the new WDC device 110, 120. This includes issuing a network key, which is required for all Zigbee devices 110, 120 on a given PAN.

A feature of this key management method is an optional means to change the master key to a new value once the pre-determined master keys have been used to allow a WDC device 110, 120 to join the network. The new master key may be additionally changed at a periodic rate with a last-known master key retained in the event of a master key change error event. If an original master key is lost, after being changed to a new master key, and having rolled past the last-known master key, it is gone forever. Only through a specific trusted new request sequence to the global universal trust 200 may a new pre-determined master key be delivered to a WDC device 110, 120 whose master key becomes corrupt or lost. This level of security provides another long term layer of assurance that no rogue devices may be allowed to join an aircraft wireless sensor network.

Another feature is the use of a distributed trust center scheme. For large networks of many hundreds or thousands of WDC devices 110, 120, having one trust center for the entire network can become unwieldy, and have undesirable latency and memory problems. As such, a distributed trust center allows for a management of subnets (e.g., PANs) by distribution of the trust center key tables 295 efficiently through a secure wired transport. A trust center is also responsible for updating the network key in a normal Zigbee network, and having this distributed trust center function located at the WDC device 110, 120 enables a more deterministic behavior to occur during a network key update. The additional security feature of changing the master key requires that a list 295 of master keys and of the last-known master keys is maintained at each trust center responsible for a given network. This updated list is also synchronized with the trust center manager hosted function 260 at the application server 145 level to ensure a coherent backup of the trust center data is maintained should a WDC device 110, 120, acting as a trust center become non-functional or is replaced. Finally, each trust center is designated as a primary or backup trust center on a given PAN. Stated another way, in at least one embodiment, each PAN has a minimum of two trust centers, where each trust center contains a duplicate of the key list 295 for the WDC devices 110, 120 within that PAN.

Figure 3:
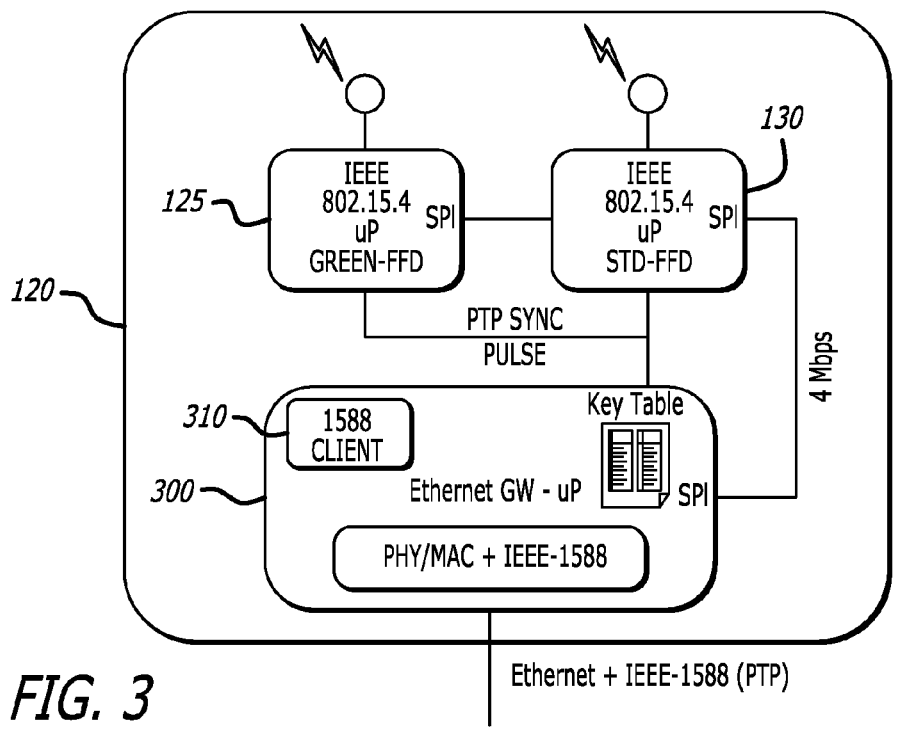
FIG. 3 is a diagram of a two-channel wireless data concentrator (WDC) that is employed by the system of FIG. 1, in accordance with at least one embodiment of the present disclosure.

FIG. 3 is a diagram of a two-channel wireless data concentrator (WDC) 120 that is employed by the system of FIG. 1, in accordance with at least one embodiment of the present disclosure. Each WDC 120, regardless of how many wireless router channels 125, 130 are supported, includes a local host Ethernet gateway microprocessor 300, which contains IEEE-1588 precision time protocol (PTP) hardware support within its TCP/IP MAC layer. Examples of devices that may be employed by the WDC 120 for the local host Ethernet gateway microprocessor 300 include, but are not limited to, a ST Micro STM32F107 device and a ARM Cortex-M3 32-bit RISC core microprocessor. The STM32F107 device, when employed by the local host Ethernet gateway microprocessor 300 for example, acts as the gateway microprocessor 300 and connects to both of the IEEE 802.15.4/Zigbee router microprocessors 125, 130 by way of one of the serial peripheral interface (SPI) ports that are configured to clock data at a minimum rate of 4 megabits per second (Mbps). The local host microprocessor 300 also contains a software client 310 to handle the time management functions of the PTP network function, which provides the precise time. The local host microprocessor 300 also distributes a precise hardware interrupt signal to each of the 802.15.4/Zigbee router microprocessors 125, 130 to enable the feature of extended precision time protocol, which is described later in the present disclosure.

Figure 4:
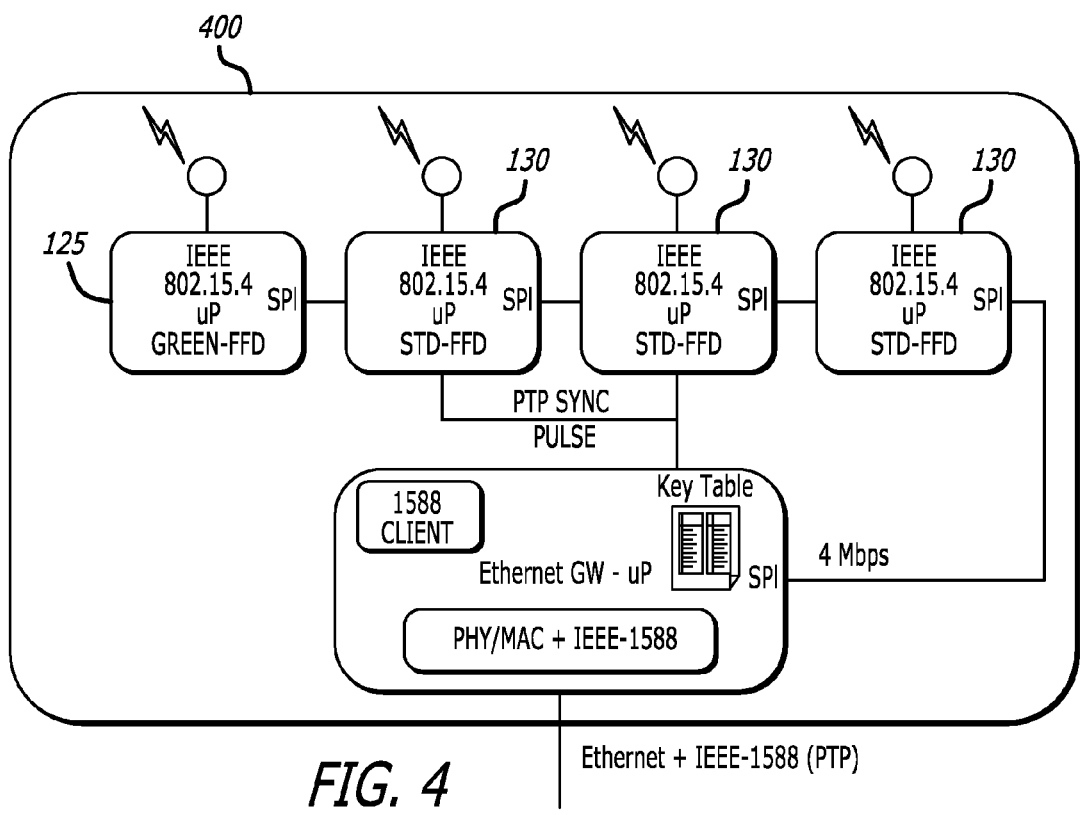
FIG. 4 is a diagram of a four-channel WDC, in accordance with at least one embodiment of the present disclosure.
Figure 5:
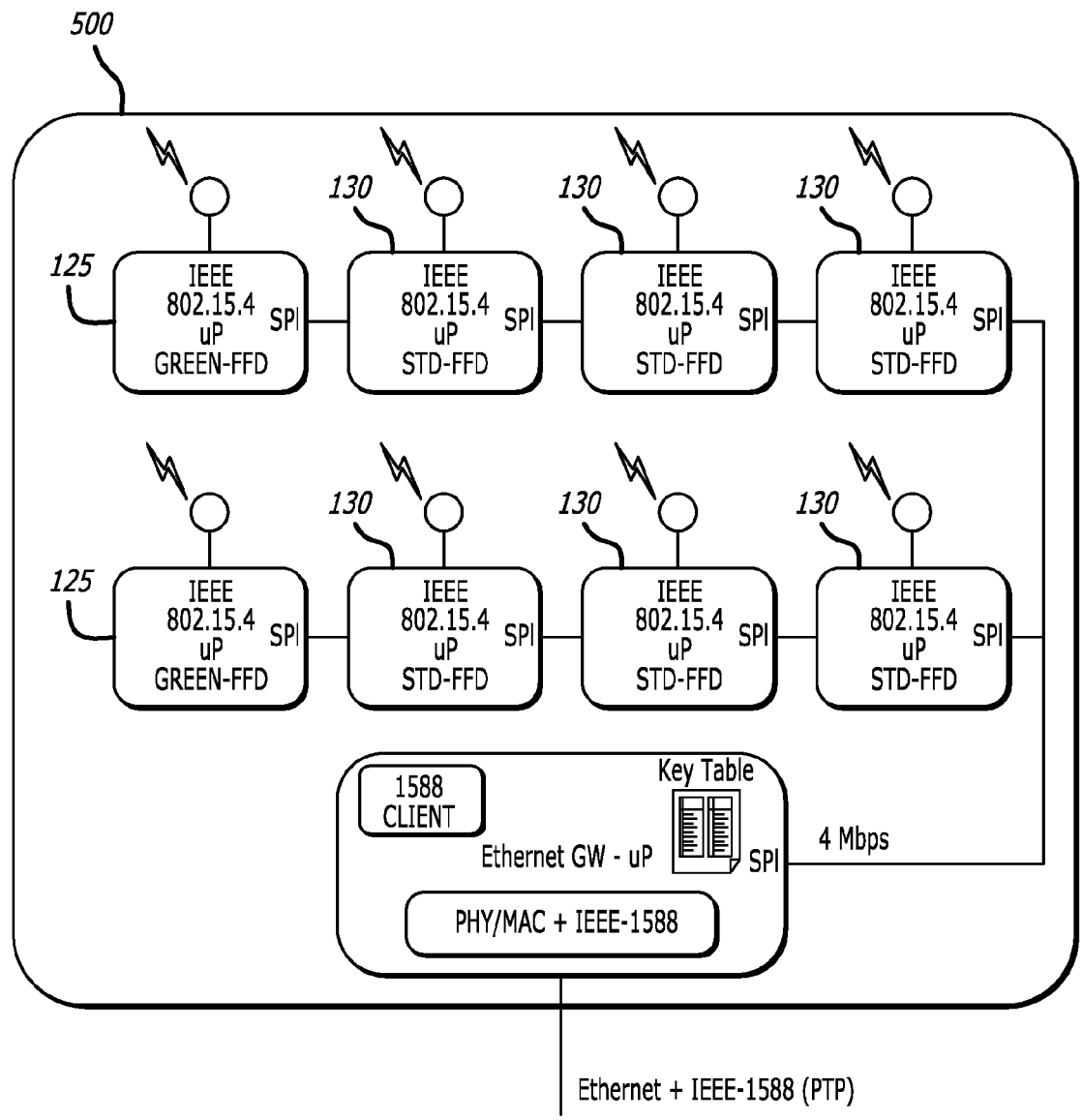
FIG. 5 is a diagram of an eight-channel WDC, in accordance with at least one embodiment of the present disclosure.
Figure 6:
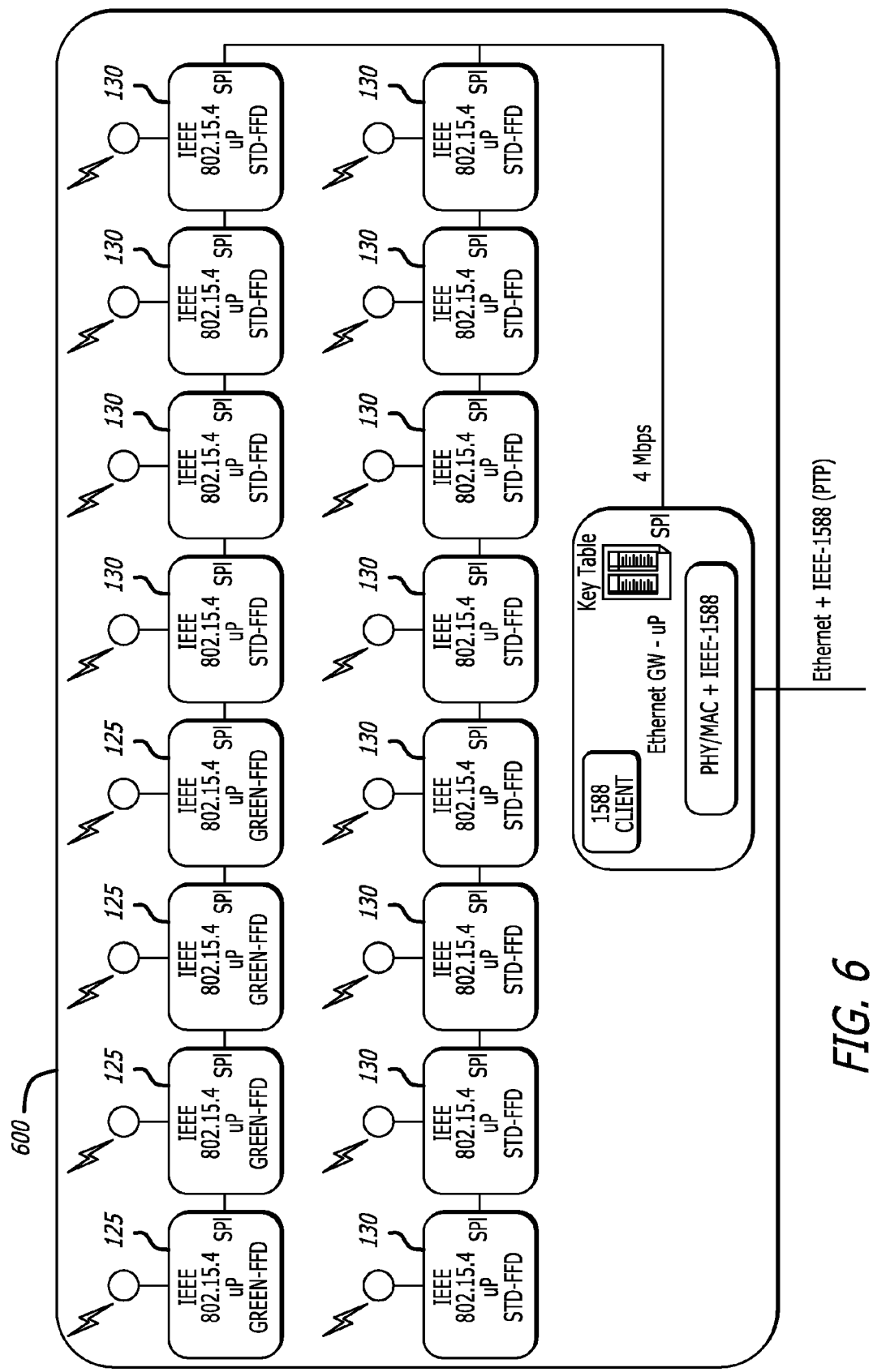
FIG. 6 is a diagram of a sixteen-channel WDC, in accordance with at least one embodiment of the present disclosure.

FIG. 4 is a diagram of a four-channel WDC 400, in accordance with at least one embodiment of the present disclosure. In this figure, the four-channel WDC 400 is shown to include one Zigbee green router 125 and four Zigbee standard routers 130. FIG. 5 is a diagram of an eight-channel WDC 500, in accordance with at least one embodiment of the present disclosure. In particular, in this figure, the eight-channel WDC 400 is shown to include two Zigbee green routers 125 and six Zigbee standard routers 130. FIG. 6 is a diagram of a sixteen-channel WDC 600, in accordance with at least one embodiment of the present disclosure. In this figure, the eight-channel WDC 400 is shown to include four Zigbee green routers 125 and six Zigbee standard routers 130.

Figure 7:
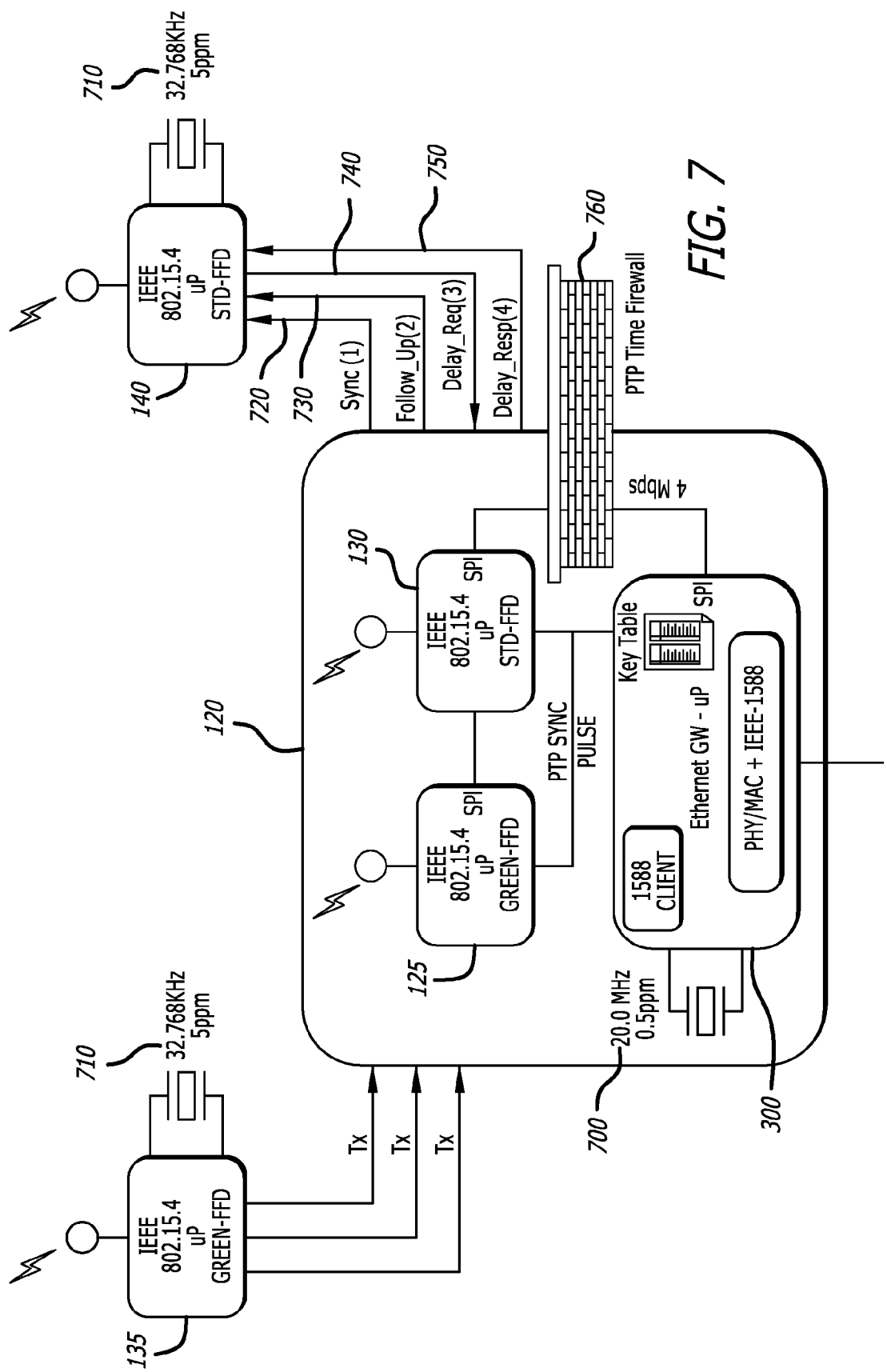
FIG. 7 is a detailed diagram depicting the extended precision time protocol (PTP) operation on a two-channel WDC, in accordance with at least one embodiment of the present disclosure.

FIG. 7 is a detailed diagram depicting the extended precision time protocol (PTP) operation on a two-channel WDC 120, in accordance with at least one embodiment of the present disclosure. The microprocessor 300 utilizes a 20.000 megahertz (MHz) (0.5 parts per million (ppm)) clock 700, which enables a less frequent update period from the PTP master across the Ethernet network than a clock frequency that is less accurate. Also, a low cost 32.768 kilohertz (KHz) watch crystal (Xtal) 710 is used for the Zigbee devices that are nodes (i.e. the Zigbee green endpoint nodes 135 and the Zigbee standard endpoint nodes 140). In this case, if a node is battery operated (i.e. a battery operated Zigbee standard endpoint node 140), it will be sleeping most of the time at a very low current state. This will require a very low frequency clock source to keep backup time established so that a less frequent synchronization is required.

In this figure, the Zigbee standard router 130 is shown to be transmitting and receiving time synchronization signals to the Zigbee standard endpoint node 140. In particular, at time T1, the Zigbee standard router 130 sends a synchronization signal 720 (i.e. Sync(1) 720) to the Zigbee standard endpoint node 140, and at time T2, the Zigbee standard router 130 sends a follow-up signal 730 (i.e. Follow_Up(2) 730) to the Zigbee standard endpoint node 140. At time T3, the Zigbee standard endpoint node 140 sends a delay request signal 740 (i.e. Delay_Req(3) 740) to the Zigbee standard router 130. And, finally, at time T4, the Zigbee standard router 130 sends a delay response signal 750 (i.e. Delay_Resp(4) 750) to the Zigbee standard router 130.

The PTP protocol introduces a hierarchical firewall nature of synchronization. To represent this synchronization firewall, a time synchronization firewall 760 (i.e. PTP Time Firewall 760) is shown to be present within the WDC 120.

This firewall 760 prevents any downstream extended PTP effect from disturbing the primary Ethernet PTP channels 125, 130. In other words, the time accuracy of the extended nodes 135, 140 is strictly governed by the time accuracy and stability of the WDC 120 local host microprocessor 300.

Figure 8:
FIG. 8 is a table that shows the typical drift rate for the two crystal (Xtal) devices employed by the disclosed system for synchronized WDCs for airborne wireless sensor networks, in accordance with at least one embodiment of the present disclosure.

FIG. 8 is a table 800 that shows the typical drift rates for the two crystal (Xtal) devices employed by the disclosed system for synchronized WDCs for airborne wireless sensor networks, in accordance with at least one embodiment of the present disclosure. In particular, the table 800 shows that the 20 MHz Xtal has better stability (0.5 parts per million (ppm) +/− spec (i.e. nominal frequency)) than the 32.768 KHz Xtal (5 ppm +/− spec).

Figure 9:
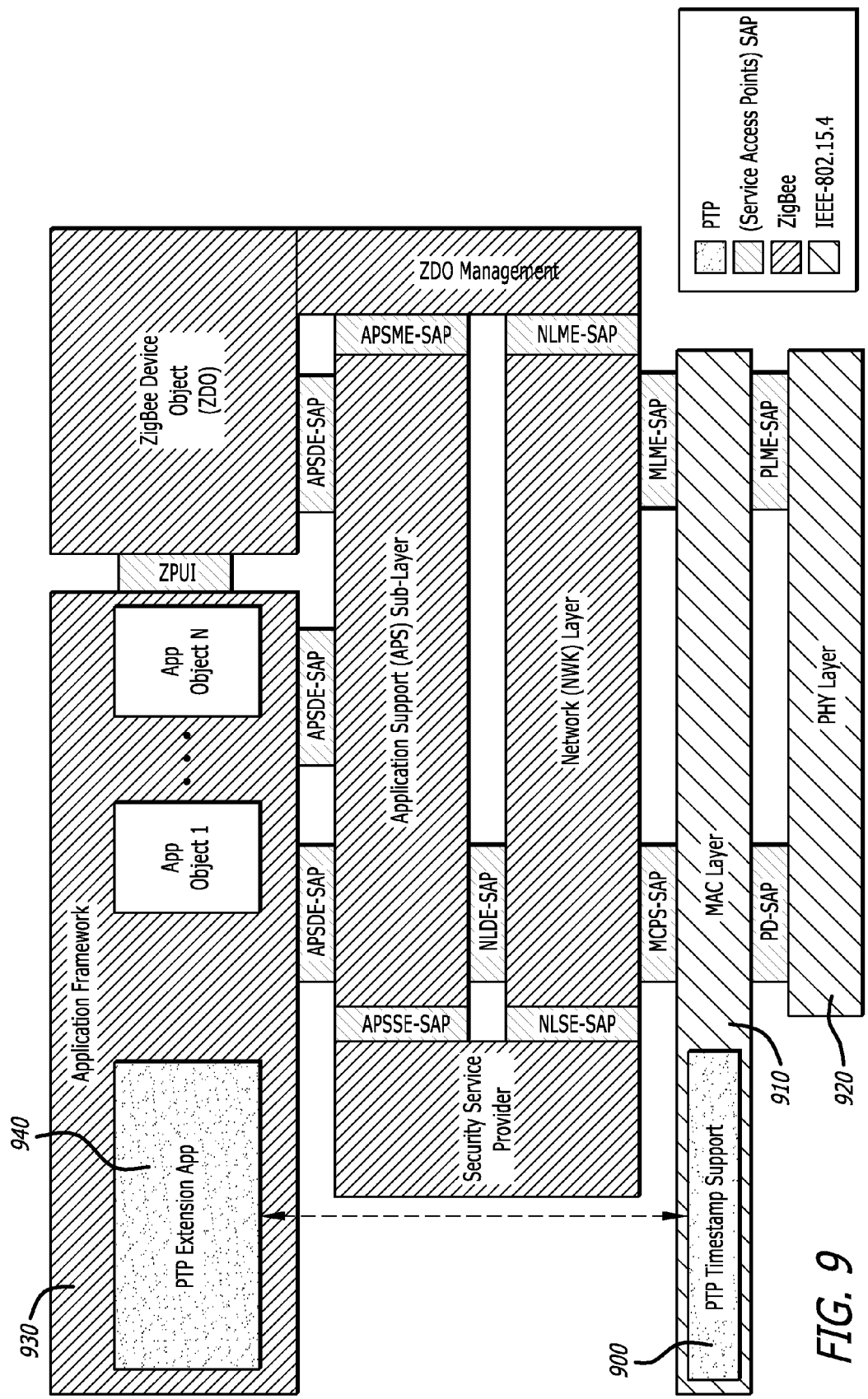
FIG. 9 is a diagram depicting a modification of a standard Zigbee/IEEE-802.15.4 software stack which is employed by the disclosed system for synchronized WDCs for airborne wireless sensor networks, in accordance with at least one embodiment of the present disclosure.

FIG. 9 is a diagram depicting a modification of a standard Zigbee/IEEE-802.15.4 software stack which is employed by the disclosed system for synchronized WDCs for airborne wireless sensor networks, in accordance with at least one embodiment of the present disclosure. In this modification, PTP time stamping support 900 is added to the MAC layer 910 to enable a low latency capture of the time when packets arrive on the 802.15.4 PHY layer 920. This time stamp information is then communicated directly to the application layer 930 where a special PTP software application 940 is resident to compute the extended PTP synchronization. Once this operation is completed, then other application objects within the Zigbee endpoint nodes 135, 140 may take advantage of a high accuracy time stamp. To allow for power down, drift trend information can be captured over time to determine the drift statistics. Referring to FIG. 8 again, one can see that the maximum drift count of the 32.768 Khz clock would be between 9 and 10 counts per minute. Once the drift is monitored in a real system (after synchronization is complete), then the drift can be managed by compensation based on the long term drift trend. A feature of this is a start up period where during certain periodic times, a higher frequency PTP synchronization occurs to determine the absolute drift during the non-critical time endpoint (i.e. node 135, 140) operation period.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for airborne wireless sensor networks, the system comprising:
at least one wireless data concentrator (WDC) operable as a router;
at least one processor that is to run hosted applications related to the at least one WDC operable as a router;
at least one network switch that is connected to the at least one WDC operable as a router and the at least one processor;
at least one node that is wirelessly in communication with the at least one WDC operable as a router; and
at least one WDC operable as a coordinator,
wherein the at least one WDC operable as a coordinator is capable of (a) coordinating communications of the at least one WDC operable as a router, (b) acting as a trust center manager that securely manages keys, maintains a key list comprising a new master key and a last-known master key, and is capable of changing the new master key for at least one of the at least one WDC operable as a router, and (c) distributing its coordinator function to at least one of the at least one WDC operable as a router,
wherein the new master key corresponds to a medium access control (MAC) address of one of the at least one WDC operable as a router.

2. The system of claim 1, wherein the at least one WDC operable as a router includes at least one standard router, which receives signals and transmits signals, and
wherein the at least one node operates as a standard node, which is powered by at least one of battery power, a wired power line, and harvested energy.

3. The system of claim 2, wherein the at least one standard router and the at least one node operable as a standard node employ an IEEE 802.15.4 based communications protocol stack.

4. The system of claim 2, wherein the at least one standard router transmits and receives signals to the at least one node operable as a standard node.

5. The system of claim 2, wherein the at least one standard router is a Zigbee standard router.

6. The system of claim 2, wherein the harvested energy is harvested from at least one of thermoelectric power, vibration, and inductive coupling to a voltage.

7. The system of claim 1, wherein the at least one WDC operable as a router includes at least one green router, which receives signals and does not transmit signals,
and wherein the at least one node operates as a green node, which is powered by harvested energy.

8. The system of claim 7, wherein the at least one green router and the at least one node operable as a green node employ an IEEE 802.15.4 based communications protocol stack.

9. The system of claim 7, wherein the at least one green router receives signals from the at least one node operable as a green node.

10. The system of claim 7, wherein the at least one node operable as a green node transmits its state three times sequentially in a row to the at least one green router.

11. The system of claim 7, wherein the at least one green router is a Zigbee green router.

12. The system of claim 7, wherein the harvested energy is harvested from at least one of solar power and manual actuation power.

13. The system of claim 1, wherein the at least one processor is an application server.

14. The system of claim 1, wherein the at least one network switch is an Ethernet switch.

15. The system of claim 1, wherein the at least one WDC operable as a coordinator employs an IEEE 802.15.4 based communications protocol stack.

16. The system of claim 1, wherein the at least one WDC operable as a coordinator is in wireless communication with the at least one WDC operable as a router, and is to coordinate communications with the at least one WDC operable as a router.

17. A method for airborne wireless sensor networks, the method comprising:
transmitting state information from at least one node;
receiving, by at least one wireless data concentrator (WDC) operable as a router, the state information;
transmitting the state information from the at least one WDC operable as a router;
receiving, by at least one WDC operable as a coordinator, the state information; and sending the state information, by the at least one WDC operable as a coordinator, to at least one processor for processing, wherein the at least one WDC operable as a coordinator is capable of (a) coordinating communications of the at least one WDC operable as a router, (b) acting as a trust center manager that securely manages keys, maintains a key list comprising a new master key and a last-known master key, and is capable of changing the new master key for at least one of the at least one WDC operable as a router, and (c) distributing its coordinator function to at least one of the at least one WDC operable as a router, wherein the new master key corresponds to a medium access control (MAC) address of one of the at least one WDC operable as a router.

18. The method of claim 17, wherein the method further comprises coordinating, by the at least one WDC operable as a coordinator, communications with the at least one WDC operable as a router.

19. The method of claim 17, wherein the state information is sent from the at least one WDC operable as a coordinator to the at least one processor via a network switch.

20. A wireless data concentrator (WDC) for airborne wireless sensor networks, the WDC comprising:
- at least one router, wherein at least one node is in communication with the at least one router;
- at least one microprocessor, wherein the at least one microprocessor is for processing signals received by the at least one router from the at least one node; and
- at least one clock crystal, wherein the at least one clock crystal is used for synchronizing communications for the at least one router, wherein the WDC is capable of (a) coordinating communications of at least one other WDC, (b) acting as a trust center manager that securely manages keys, maintains a key list comprising a new master key and a last-known master key, and is capable of changing the new master key for at least one of the at least one other WDC, and (c) distributing a coordinator function to at least one of the at least one other WDC, wherein the new master key corresponds to a medium access control (MAC) address of one of the at least one other WDC.

* * * * *